United States Patent
Wong

(10) Patent No.: US 8,843,178 B1
(45) Date of Patent: *Sep. 23, 2014

(54) WIRELESS HOTSPOT DEVICE CAPABLE OF SHARING VIDEO PICTURE

(71) Applicant: Gigastone America Corp, Santa Clara, CA (US)

(72) Inventor: John Wong, Taipei (TW)

(73) Assignee: Gigastone America Corp, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/166,254

(22) Filed: Jan. 28, 2014

(51) Int. Cl.
*H04M 1/00* (2006.01)
*H04M 1/725* (2006.01)
*H04W 88/08* (2009.01)

(52) U.S. Cl.
CPC ...... *H04M 1/72527* (2013.01); *H04M 1/72561* (2013.01); *H04W 88/08* (2013.01)
USPC .................. 455/556.1; 455/412.1; 455/550.1

(58) Field of Classification Search
USPC ......... 455/412.1, 550.1, 556.1, 557, 558, 559
See application file for complete search history.

(56) References Cited

U.S. PATENT DOCUMENTS

| 8,541,985 | B1* | 9/2013 | Wong | 320/140 |
|---|---|---|---|---|
| 2002/0025832 | A1* | 2/2002 | Durian et al. | 455/556 |
| 2004/0242224 | A1* | 12/2004 | Janik et al. | 455/426.1 |
| 2006/0229100 | A1* | 10/2006 | Born | 455/557 |
| 2011/0136541 | A1* | 6/2011 | Chang et al. | 455/558 |
| 2012/0252382 | A1* | 10/2012 | Bashir et al. | 455/114.3 |
| 2013/0254560 | A1* | 9/2013 | Leung | 713/300 |
| 2014/0051399 | A1* | 2/2014 | Walker et al. | 455/412.1 |
| 2014/0087788 | A1* | 3/2014 | Filipovic et al. | 455/557 |

* cited by examiner

*Primary Examiner* — Ping Hsieh
(74) *Attorney, Agent, or Firm* — C. G. Mersereau; Nikolai & Mersereau, P.A.

(57) ABSTRACT

A wireless hotspot device capable of sharing video picture includes a first control unit connected with a battery and a second control unit. The second control unit is connected with a wireless transmission unit and a high-definition multimedia interface transmission port. The second control unit via the high-definition multimedia interface transmission port is connected with an external terminal apparatus. By means of the wireless hotspot device, the picture of the screen of a mobile device connected with the wireless hotspot device can be synchronously displayed on the screen of the external terminal apparatus. Also, the wireless hotspot device can charge the mobile device or other mobile device at the same time.

15 Claims, 20 Drawing Sheets

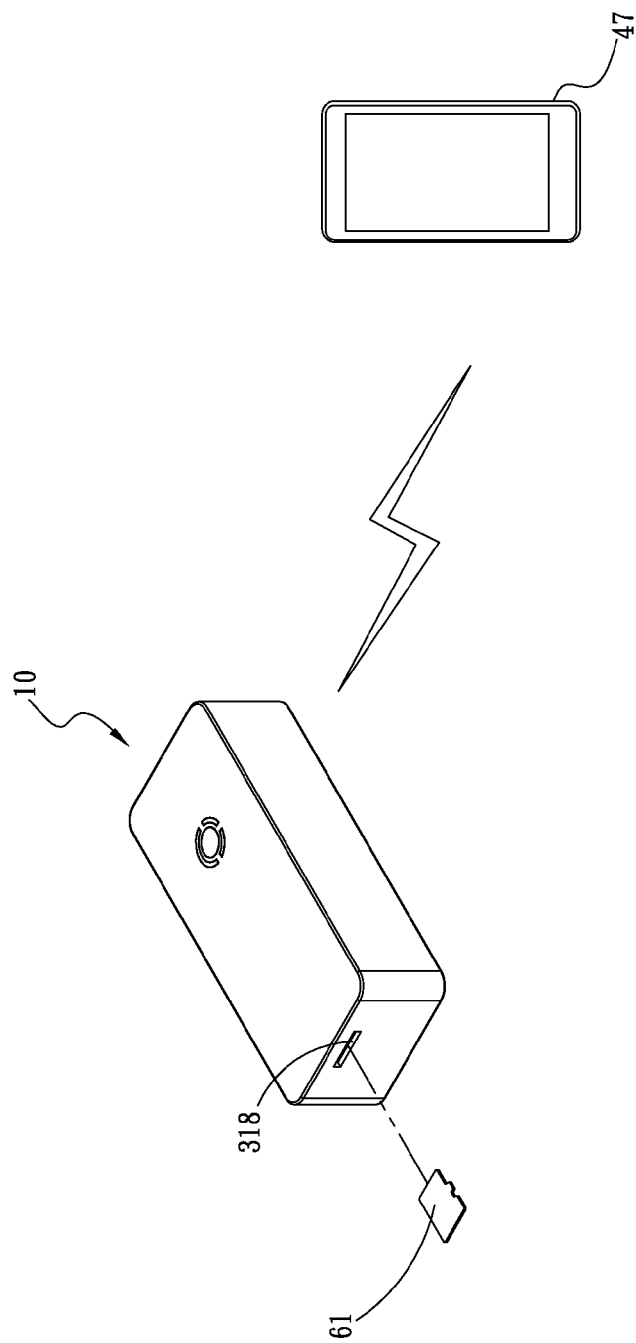

WIRELESS HOTSPOT DEVICE CAPABLE OF SHARING VIDEO PICTURE

BACKGROUND OF THE INVENTION

1. Field of the Invention

The present invention relates generally to a wireless hotspot device capable of sharing video picture, and more particularly to a wireless hotspot device, which is easy to carry and is able to synchronously display the picture of the screen of a mobile device on the screen of an external terminal apparatus.

2. Description of the Related Art

Various portable electronic products such as intelligent mobile phones and tablets have been developed. There is a trend to design these electronic products with higher and higher operation speed and humanize the application of the electronic products. Therefore, the electronic products are equipped with high-rank processors and many sensation elements. In operation, these components will consume much power so that it is necessary to readily supplement the electronic products with power.

The existent storage device is for a user to access data. The most often seen storage device is mobile power, Nand Flash storage device, hard disk drive, etc. The mobile power is equipped with a personal wireless server and high-capacity memory so that the volume of the mobile power is considerably large. Therefore, it is inconvenient to carry the mobile power.

In recent years, along with the popularization of the universal serial bus (USB) interface and flash memory, a substitutive product, that is, USB flash disk has been produced. The USB flash disk has the advantages of high capacity, better compatibility and convenient carriage. The USB flash disk can be conveniently used to transfer data between different computers and storage devices.

In addition, some manufacturers have developed portable hard disks. The portable hard disk is composed of a hard disk drive enclosure and a hard disk drive or a USB flash disk. Via a USB interface, the data of the portable hard disk can be accessed. Also, via the USB interface, the data can be transmitted in a wired manner.

In the case that a user needs to copy or transmit data via a wireless network, the user must carry a wireless network card, a portable storage device as well as a mobile power with him/her. The portable storage device itself has no power supply unit so that it is necessary to power the portable storage device with the mobile power for normal operation. Therefore, it is quite inconvenient to use the portable storage device.

Moreover, application of multimedia has been more and more emphasized in the current portable electronic products. Therefore, the small-size screen of mobile phone has been replaced with large-size screen, which is even identical to the screen of a tablet. The mobile phone with a small-size screen has the advantage of easy operation and convenient carriage and holding. The mobile phone with a large-size screen is advantageous in that a user can have a better vision. Also, the large-size screen displays larger legends or pushbuttons so that the possibility of mis-touch is minimized.

However, both the large-size screen and small-size screen are simply suitable for personal use and it is impossible for the screen of the mobile device to share pictures with many persons at the same time.

Furthermore, the screen of the portable electronic products such as intelligent mobile phones and tablets is generally not so large. In the case that many persons want to watch the picture of the screen at the same time, these persons will crowd around the mobile phone or the tablet. A mini-projector or so-called micro-projector can be used to solve the above problem. The existent micro-projector is installable in an intelligent mobile phone for showing the picture of the mobile phone on an external large screen. Alternatively, an independent micro-projector can be connected with a mobile phone.

However, with respect to both the mobile phone and the micro-projector, the power consumption is quite large so that it is impossible to long-term use the mobile phone or the micro-projector.

SUMMARY OF THE INVENTION

It is therefore a primary object of the present invention to provide a wireless hotspot device, which is able to synchronously display the picture of the screen of a mobile device on the screen of an external terminal apparatus. Also, the wireless hotspot device can charge the mobile device or other mobile device at the same time.

It is a further object of the present invention to provide the above wireless hotspot device, which is connected with a micro projector device for projecting the picture of the screen of a mobile device.

It is still a further object of the present invention to provide the above wireless hotspot device, which can charge a mobile device or enable another mobile device to wirelessly access data via Internet.

It is still a further object of the present invention to provide the above wireless hotspot device, which serves as a wireless hotspot device for server end and cloud access.

It is still a further object of the present invention to provide the above wireless hotspot device, which can be used as a router.

It is still a further object of the present invention to provide the above wireless hotspot device, which has an inbuilt flash memory as a storage device. The data of the flash memory can be accessed via network stream.

It is still a further object of the present invention to provide the above wireless hotspot device, which is connectable with a hard disk drive (HDD) or card reader or pen driver as an external expansion storage device. The data of the external expansion storage device can be accessed via network stream.

It is still a further object of the present invention to provide the above wireless hotspot device, which has an inbuilt card-reading unit for an electronic card to insert therein.

To achieve the above and other objects, the wireless hotspot device capable of sharing video picture of the present invention includes: a negative booster connected with a first connection port and a battery, the first connection port being for an external power to input power; a booster connected with the battery and a second connection port; a first control unit connected with the negative booster, the booster, a switch and an LED indicator, the first control unit serving to control the external power passing through the negative booster to drop the voltage of the external power to a voltage meeting the battery power and control the booster to boost the voltage of the battery power to a preset value; a second control unit connected with the first control unit and a wireless transmission unit, the second control unit including a connection interface connected with a multimedia playing module, an Ethernet interface, multiple backup network/file access modules and a connector module, the multiple backup network/file access modules being used to control the data transmission/access of the networks and cloud, the connector module including a hub/switch connected with a controller, the hub/switch being further connected with the connection interface and the second connection port, the controller being connected with a flash memory, the second connection port being for outputting the battery power or transmitting data; an Ethernet connection port connected with the Ethernet interface of the second control unit; a regulator connected with the battery and the second control unit, through the regulator, the battery power being provided for the second control unit and the wireless transmission unit; and a high-definition multimedia interface (HDMI) transmission port connected with the connection interface of the second control unit as an interface for the multimedia playing module of the second control unit to output video/audio signals.

The wireless hotspot device includes a main body having an upper casing and a lower casing mated with the upper casing. The upper and lower casings define therebetween a chamber. The upper casing has a top wall and multiple sidewalls perpendicularly extending from a periphery of the top wall. A pushbutton is disposed on the top wall corresponding to the switch. Multiple transparent sections are arranged on the top wall in alignment with the LED indicator. One sidewall of the multiple sidewalls is formed with multiple perforations corresponding to the first and second connection ports and the HDMI transmission port and the Ethernet connection port respectively.

In the above wireless hotspot device, the first and second connection ports are USB connection ports.

In the above wireless hotspot device, the connector module is a USB connector module, the hub/switch is a USB hub/switch and the controller is a USB controller.

In the above wireless hotspot device, the second connection port is connected with a charged mobile device or an external storage device.

In the above wireless hotspot device, the external storage device is selected from a group consisting of hard disk drive (HDD), card reader and pen driver.

In the above wireless hotspot device, the HDMI transmission port is connectable with an external terminal apparatus.

In the above wireless hotspot device, the external terminal apparatus is selected from a group consisting of a monitor, a television and a projector.

In the above wireless hotspot device, the multiple backup network/file access modules include a server module, a router module, a cloud storage management module, a file system module and a secure sockets layer (SSL) module.

In the above wireless hotspot device, the first and second control units are connected via a bus.

In the above wireless hotspot device, further includes a 3G/4G wireless communication unit connected with the hub/switch.

The above wireless hotspot device is connected with a micro projector device. The micro projector device includes a micro projection optical module connected with a video/audio input interface and a power management module. The video/audio input interface is connected with an audio output unit. The video/audio input interface is connected with the HDMI transmission port of the wireless hotspot device. The power management module is connected to the second connection port of the wireless hotspot device.

In the above wireless hotspot device, the multimedia playing module includes a DLNA module, a WiDi module, an Airplay module and a Miracast module.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 11B is a view showing the card reader operation mode of the present invention in a second state;

DETAILED DESCRIPTION OF THE PREFERRED EMBODIMENTS

Figure 1:
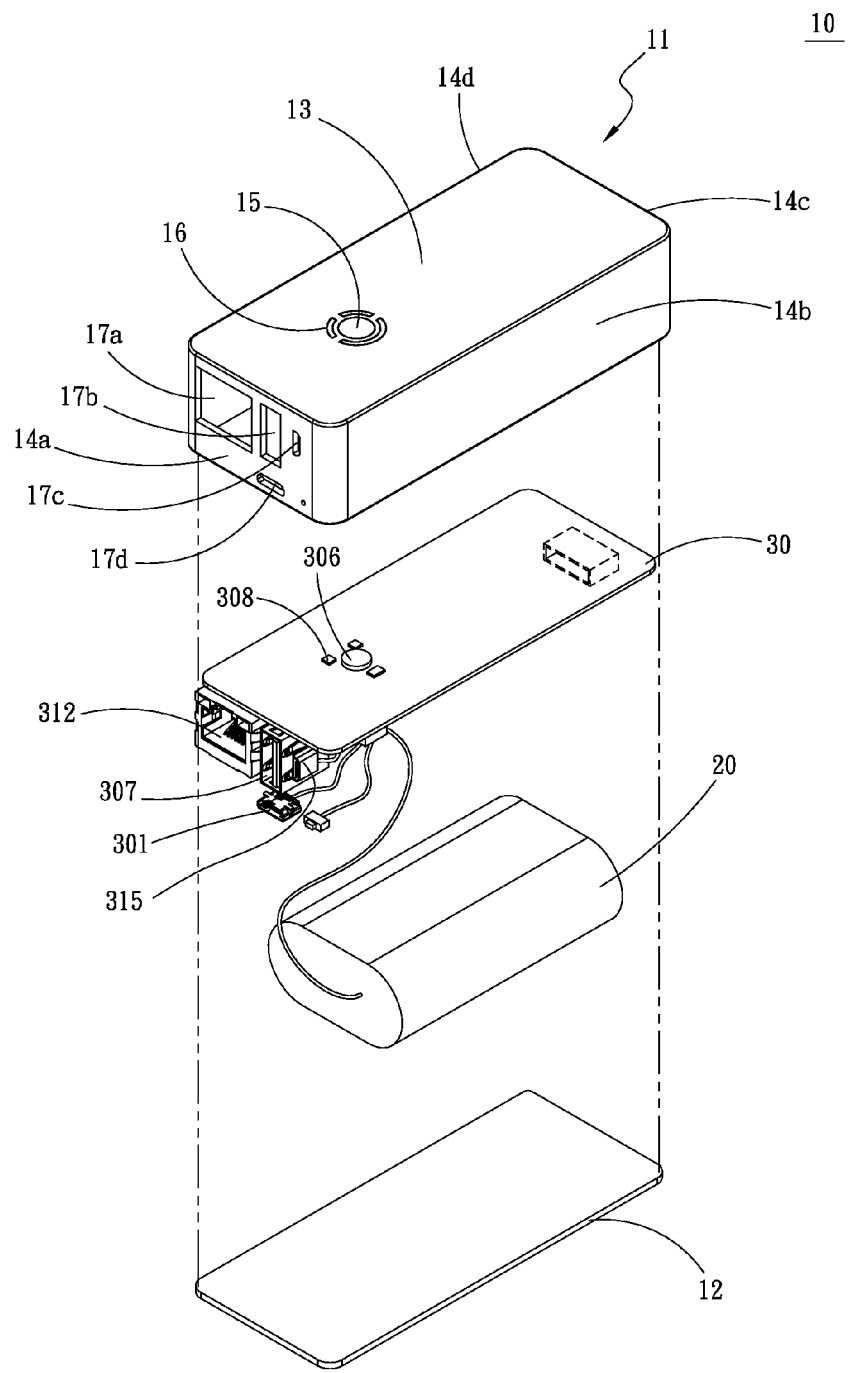
FIG. 1 is a perspective exploded view of the present invention.

The embodiments of the present invention will be described hereinafter with reference to the drawings, wherein the same components are denoted with the same reference numerals.

Figure 2A:
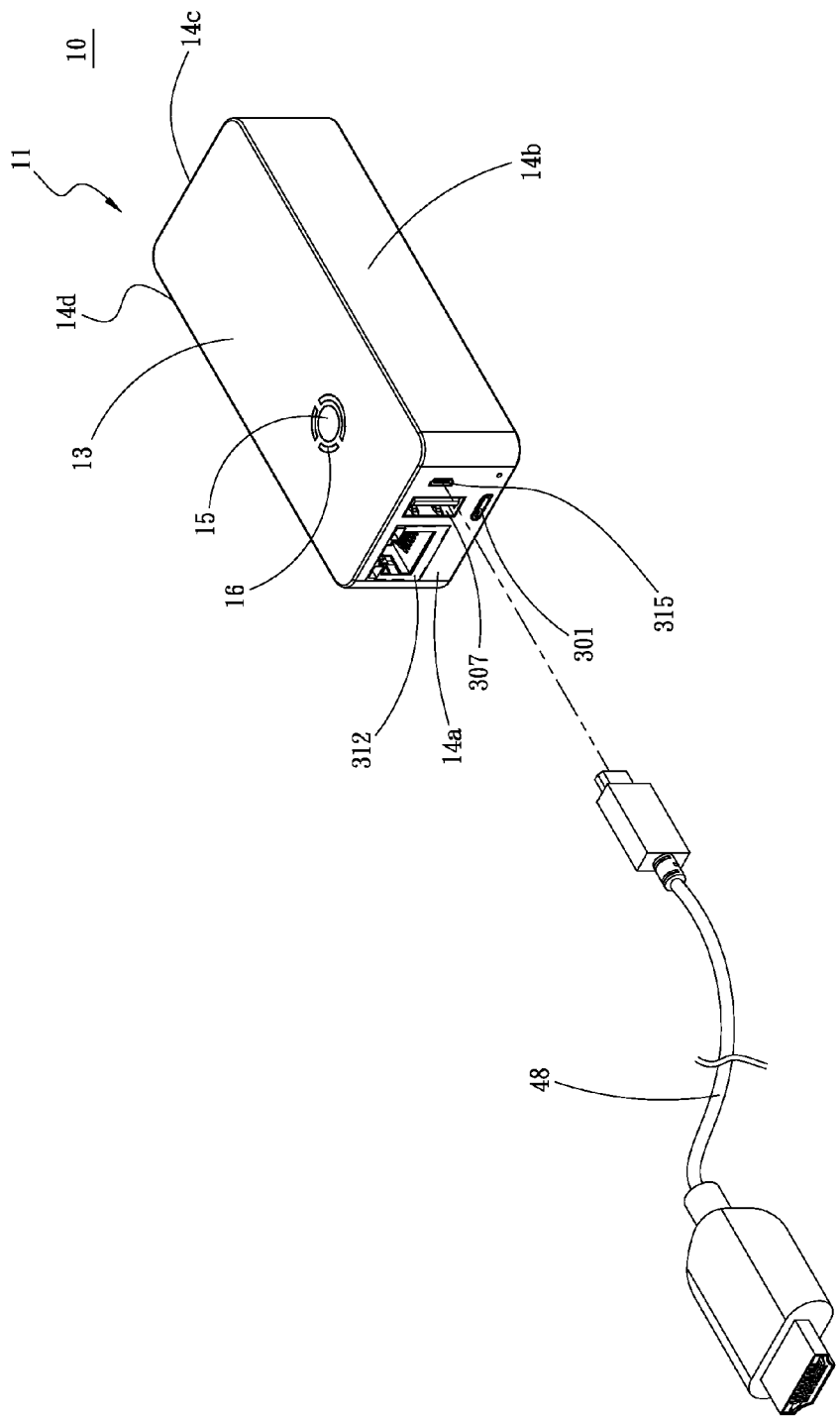
FIG. 2A is a perspective assembled view of the present invention.
Figure 2B:
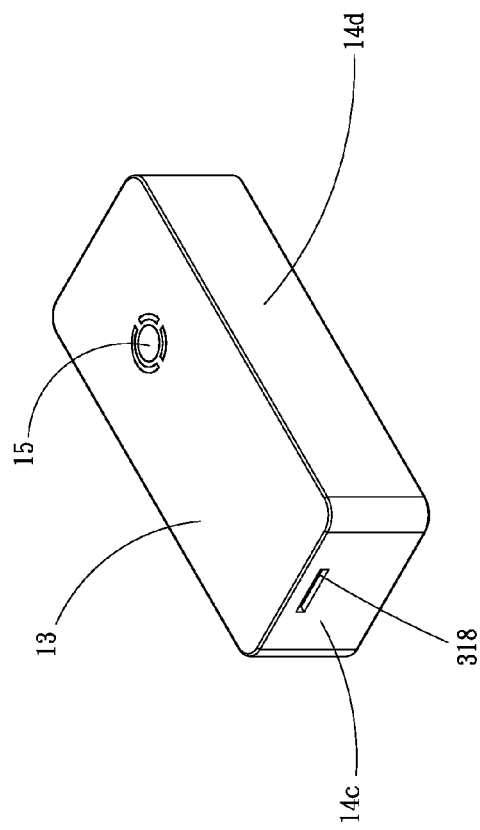
FIG. 2B is a perspective assembled view of the present invention, seen from another angle.
Figure 3:
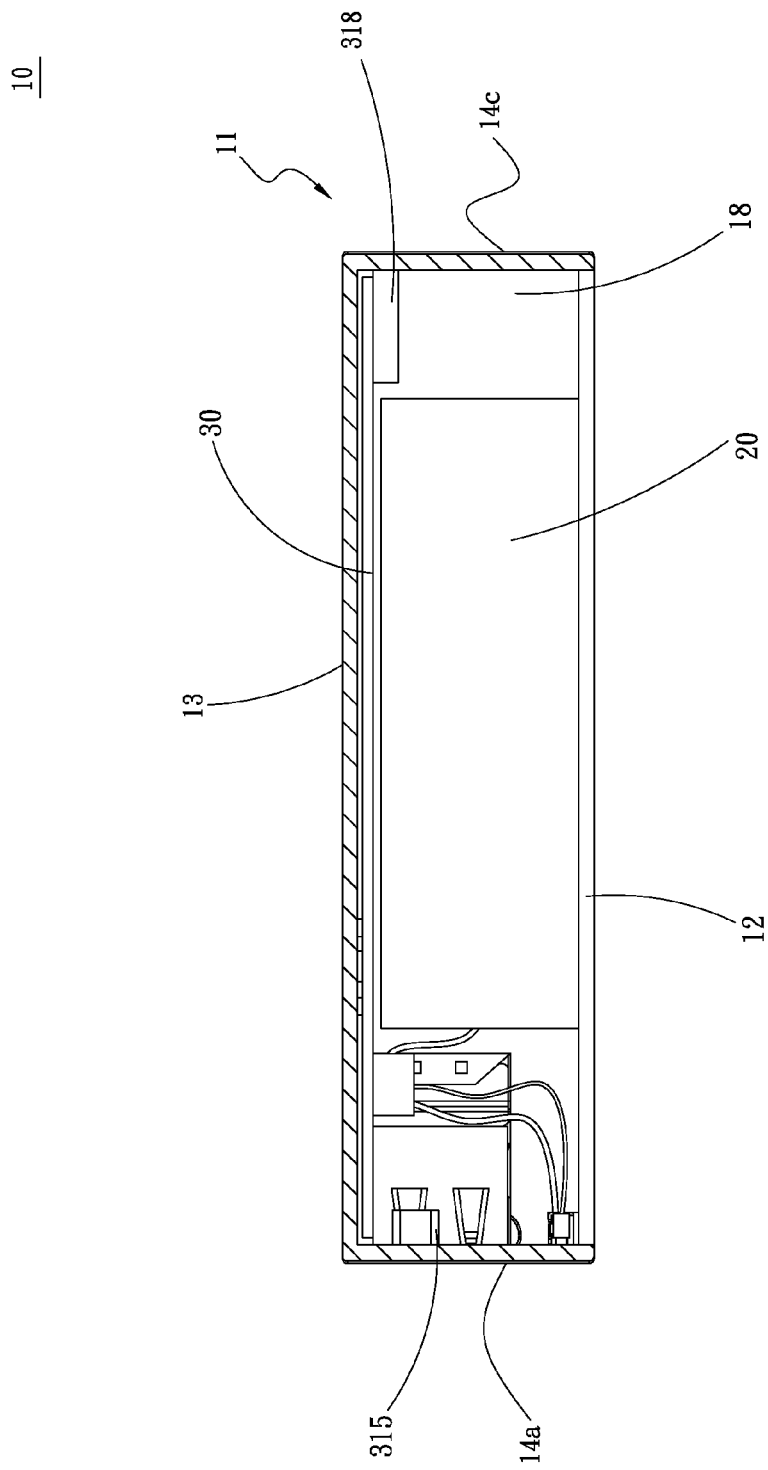
FIG. 3 is a side sectional view of the present invention.

Please refer to FIGS. 1, 2A, 2B and 3. FIG. 1 is a perspective exploded view of the present invention. FIG. 2A is a perspective assembled view of the present invention. FIG. 2B is a perspective assembled view of the present invention, seen from another angle. FIG. 3 is a side sectional view of the present invention. As shown in the drawings, the wireless hotspot device of the present invention includes a main body 10 having an upper casing 11 and a lower casing 12 mated with the upper casing 11. The upper and lower casings 11, 12 define therebetween a chamber 18. A battery 20 and a circuit board 30 are disposed in the chamber 18 and connected with each other.

The battery 20 is rechargeable by an external power (Vout) to store electrical energy and output a battery power (Vbat) such as, but not limited to, DC 3.6V~5V. The battery 20 is, but not limited to, a lithium ion battery, lithium iron phosphate battery, lead acid battery or lithium manganese battery.

Please now refer to FIG. 4, which is a circuit block diagram of the present invention. The circuit board 30 includes a negative booster 302 connected with a first connection port 301 and the battery 20, a booster 303 connected with the battery 20 and a second connection port 307, a first control unit 305 connected with the negative booster 302 and the booster 303, a switch 306 and an LED indicator 308. When the external power (Vout) passes through the negative booster 302 from the first connection port 301, the first control unit 305 controls the negative booster 302 to drop the voltage of the external power (Vout) to a voltage meeting the battery power (Vbat). After the battery 20 is fully charged, the first control unit 305 restricts the external power (Vout) from further charging the battery 20 so as to avoid over-charging of the battery 20 and over-output of the battery power (Vbat) to a charged apparatus. In addition, when the battery power (Vbat) of the battery 20 passes through the booster 303 to the second connection port 307 for output, the first control unit 305 controls the booster 303 to boost the voltage of the battery power (Vbat) to a preset value.

Figure 5A:
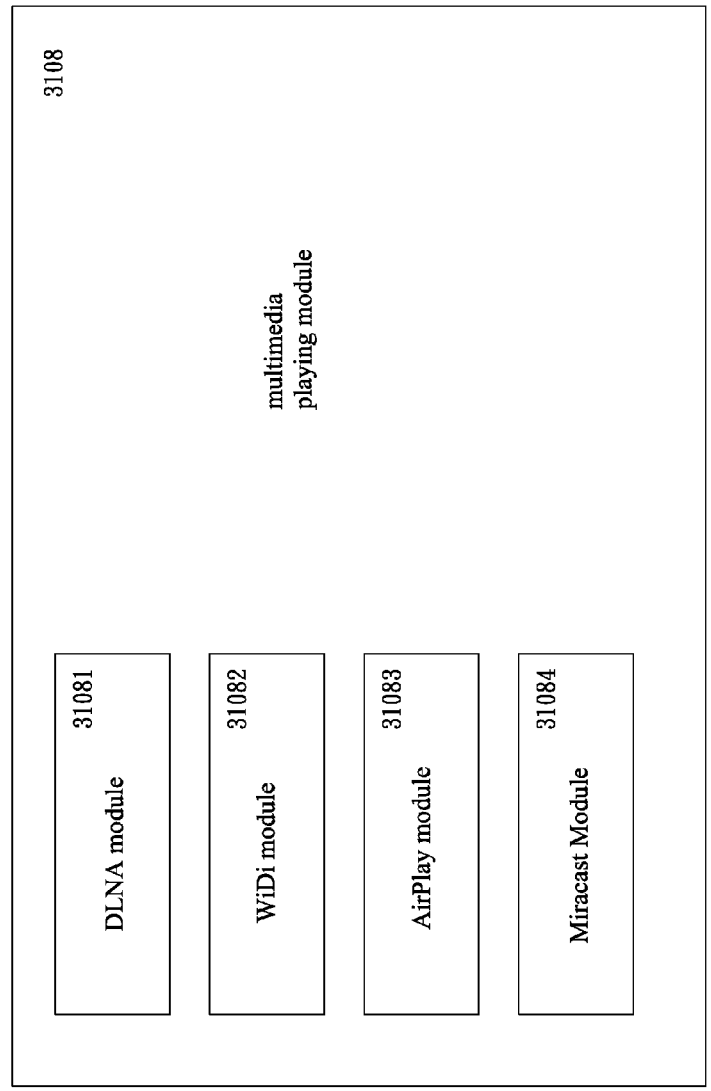
FIG. 5A is a block diagram of the multimedia playing module of the present invention.
Figure 5B:
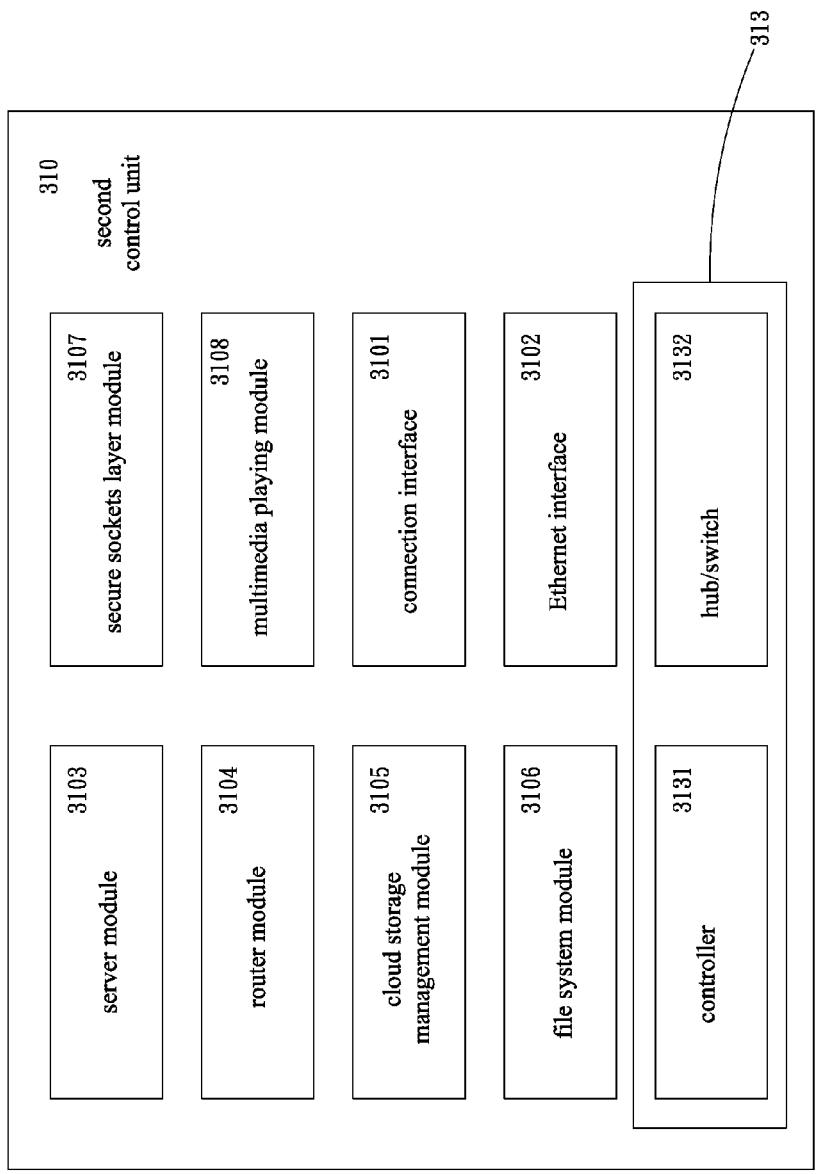
FIG. 5B is a block diagram of the second control unit of the present invention.

A second control unit 310 is connected with the first control unit 305. In a preferred embodiment, the second control unit 310 can be connected with the first control unit 305 via, but not limited to, a bus. Alternatively, the second control unit 310 can be connected with the first control unit 305 by any other means such as circuit layout. A wireless transmission unit 311 is connected with the second control unit 310. The wireless transmission unit 311 has an antenna 3111. The second control unit 310 includes a connection interface 3101, an Ethernet interface 3102, multiple backup network/file access modules (as shown in FIG. 5B) and a connector module 313. The multiple backup network/file access modules are used to control the data transmission/access of the networks and cloud. The connector module 313 is connected with the connection interface 3101.

The connector module 313 includes a hub/switch 3131 connected with a controller 3132, the connection interface 3101 and the second connection port 307. In this embodiment, the connector module 313 is preferably a USB connector module. The hub/switch 3131 is preferably a USB hub/switch. The controller 3132 is preferably a USB controller.

A regulator 314 is connected with the battery 20 and the second control unit 310. Through the regulator 314, the battery power (Vbat) has a stable voltage provided for the second control unit 310 and the wireless transmission unit 311.

A flash memory 316 is connected with the controller 3132. The controller 3132 inputs data to the flash memory 316 to generate an error-correcting code (ECC) or an error-detecting code (EDC).

An inbuilt card-reading unit 318 is connected with the second control unit 310. The inbuilt card-reading unit 318 is a card-reading slot for an electronic card 61 to insert therein (as shown in FIG. 4B). As shown in FIGS. 2B and 3, the inbuilt card-reading unit 318 is disposed at the other end of the main body 10. The electronic card 61 is used to expand the inbuilt capacity of the wireless hot spot device and is data-readable. The electronic card 61 is such as, but not limited to, Secure Digital card (SD), Near Field Communication card (NFC), Compact Flash card (CF), SmartMedia card (SMC), Multimedia card (MMC) or Memory stick card (MS).

Figure 4A:
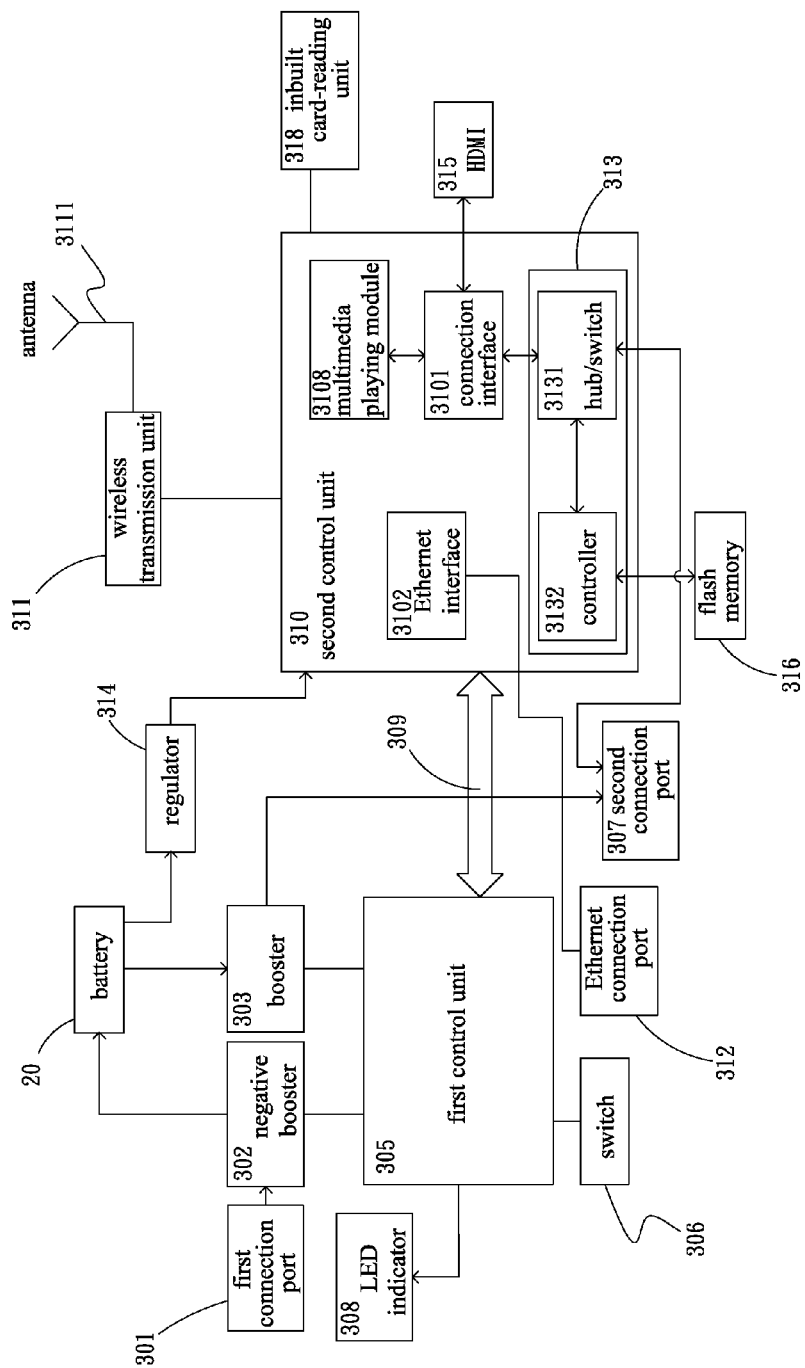
FIG. 4A is a circuit block diagram of the present invention.
Figure 4B:
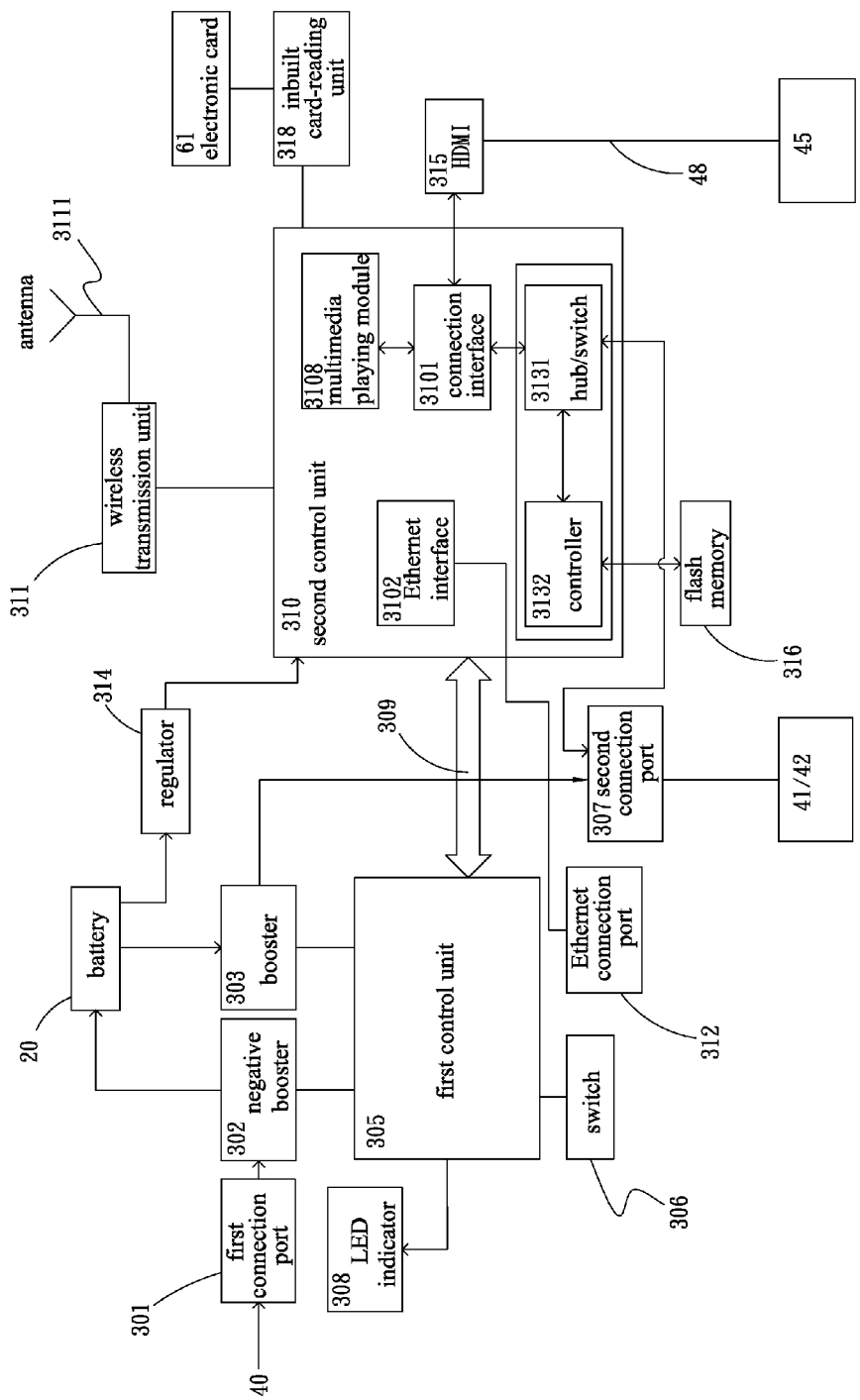
FIG. 4B is a block diagram similar to FIG. 4A showing connections to external devices.

Via the inbuilt card-reading unit 318, the video data in the electronic card 61 can be output by the multimedia playing module 3108 in the second control unit 310 from the high-definition multimedia interface (HDMI) transmission port 315 through the connection interface 3101 to an external terminal equipment 45 (as shown in FIG. 4B). Alternatively, a mobile device such as an intelligent mobile phone or a tablet can be connected to the wireless hot spot device in a wireless manner to access the video data in the electronic card 61. Please further referring to FIG. 5A, the connection interface 3101 is also connected to the multimedia playing module 3108 in addition to the hub/switch 3131 of the connector module 313. The multimedia playing module 3108 includes a DLNA module 31081, a WiDi module 31082, an Airplay module 31083 and a Miracast module 31084.

DLNA is the abbreviation of Digital Living Network Alliance. This is an alliance composed of manufacturers of consumptive electronic products, mobile phones and computers. The object of the alliance is to establish an industrial standard enabling the respective manufacturers to connect with each other and be compatible with each other so as to realize the digitalization of lives of the consumers.

The versions of DLNA products mainly are as follows:

v1.0

Digital Media Server (DMS): device for obtaining, recording and storing media files as a source.

Digital Media Player (DMP): device for finding and playing or outputting any media file provided by DMS.

v1.5 adding several devices and functions to the original DMS and DMP

Mobile Digital Media Server (M-DMS): server defined according to small-volume, lightweight and mobile electronic device such as mobile phone, the multimedia form support being slightly different from that of a common DMS.

Mobile Digital Media Player (M-DMP): player for mobile device, the multimedia form support being slightly different from that of a common DMP.

Digital MediaController (DMC): device used as a remote control device for finding the multimedia files on the DMS and designating the DMP capable of playing the multimedia files to play or control uploading/downloading of the multimedia files to the DMS.

Digital Media Printer (DMPr): providing printing function under the DLNA network frame.

WiDi is the abbreviation of Wireless Display. This is issued by Intel on American Consumptive Electronic Show (CES) in 2010. The technique is to wirelessly transmit the content displayed on a notebook screen to a television and a large-size display. On the San Francisco IDF Forum in September, 2010, the WiDi technique was further applied to tablet products. Intel WiDi technique employs the standard Wi-Fi, which has popularly existed in NB. Via a small-size and lightweight receiver, NB can be connected to a HD television to easily transmit videos, photos and music from NB to the television.

AirPlay module 31083 is a playing technique issued by Apply. AirPlay module 31083 can transmit the video mirror images on iPhone, iPod touch, iPad and Mac (necessitating OS X Mountain Lion) to an apparatus supporting AirPlay to play the video mirror images, (such as speaker or Apple TV). The use of AirPlay necessitates iOS4.2 version equipment or an version over iTunes10.1 on Mac computer, while video pictures necessitate iOS 5 and OS X Mountain Lion.

Miracast module 31084 is regulated by Wi-Fi alliance in 2012. The Miracast module 31084 is a wireless display standard based on Wi-Fi Direct. The 3C device supporting the standard can wirelessly share video pictures. For example, via Miracast, a mobile phone can directly play the videos or photos on a television or other device without any connection wire or wireless access point (AP).

Miracast is also referred to as Wi-Fi Display technique proposal. Miracast is a screen wireless reception technique based on Wi-Fi communication core technique. "Miracast" is a product mark provided by Wi-Fi alliance for products that pass Wi-Fi Display certification. Basically, any electronic apparatus marked with Miracast certification is qualified to have an application function that maximally supports Wi-Fi Display technique forum. The core application function of Wi-Fi Display is to share or transfer video/audio data between apparatuses via Wi-Fi wireless network environment connection. For example, via Wi-Fi Display technique, an intelligent mobile phone can project the picture of the mobile phone to a large-size TV screen or even the TV Tuner of the television can project the received picture to the screen of a mobile device for playing the picture. On one hand, Wi-Fi Display provides content suppliers and hardware manufacturers with more imagination of video/audio content interactive application and on the other hand, Wi-Fi Display provides more elastic reception application means for users to use intelligent devices and playing devices.

There are quite many Wi-Fi technique support items relied on by Miracast. Basically, the support of Wi-Fi Direct, (that is, Wi-Fi P2P) is needed. Especially, in the condition that the use environment has no AP (Access Point), two Wi-Fi apparatuses can be directly connected with each other to perform communication connection at the same time. Such technique application frame is especially suitable for integration of domestic electrical appliances. Via the function integration of Miracast, it is unnecessary for a user to prepare any Wi-Fi AP. The user can use wireless video/audio transmission application function of Miracast only in case of support of the mobile device and the existent TV. The most convenient thing is that Miracast further optimizes the setting process in accordance with the circumstance of the user. The Wi-Fi network environment can be automatically arranged and the Wi-Fi equipment support can be freely added so that the difficulty in operation is minimized.

The Wi-Fi technique items relied on by Miracast further include IEEE802.11n, which also supports WMM (Wi-Fi Multimedia). This technique also provides QoS service in accordance with optimization of video/audio data streaming transmission application. In addition, WPA2 is the second version of Wi-Fi Protected Access. WPA2 mainly serves to provide encryption and protection design for streaming video/audio transmission process. With respect to Android terminal product for performing Miracast function, the two most critical Wi-Fi techniques are Wi-Fi Direct and Wi-Fi Multimedia.

With respect to wireless video/audio transmission form supported by Miracast, the Android apparatus end can process quite many video specifications. The screen definition of 17 kinds of CEA forms ranges from 640*480 to 1,920*1,080 and Frame rate ranges from 24 to 60 fps. The screen definition of VESA form ranges from 800*600 to 1,920*1,200 and Frame rate ranges from 30 to 60 fps. With respect to handheld apparatus form, the display definition ranges from 640*360 to 960*540 and Frame rate ranges from 30 to 60 fps. In addition to video, the audio can be selected from LPCM/16 bits/48 kHz sampling rate/dual-track and LPCM/16 bits/44.1 kHz sampling rate/dual-track to also support Advanced Audio coding and Dolby Advanced Codec 3. In practice, the video/audio specification level responsive to Miracast also can support the wireless application requirement of the mainstream video/audio digital content.

As aforesaid, the multimedia playing module 3108 includes a DLNA module 31081, a WiDi module 31082, an Airplay module 31083 and a Miracast module 31084. Therefore, the multimedia playing module 3108 has stream content display function and mirror display function. The stream content display means the multimedia files are output to a terminal device to play. In general, preferably, the multimedia content is still played in a streaming manner. This is because the streaming is unlikely to cause distortion and the load on the mobile device is smaller. The mirror display can be classified into direct mirror display and extension mirror display. The direct mirror display is to duplicate the picture on the mobile device, while the extension mirror display is often seen in brief or game application. For example, a tablet is used as a handle, while the real game picture is extended to a television to display. In mirror display, the size of the terminal screen and the object of mirror display must be mainly taken into consideration. For example, in a brief, generally a large screen or a projector will be used and the object is to share the picture. Therefore, the mirror display is very beneficial to the users.

The video signal forms supported by the multimedia playing module 3108 are such as, but not limited to, AVI, MP4, RMB, WMA, MKV, Divx, Xvid, MPEG-2 and MPEG-4. The audio signal forms of the multimedia playing module 3108 are such as, but not limited to, MP3, AC3, AAC, ADPCM, ATRAC, DTS, MP2, Musepack, Ogg Vorbis and WMA.

Further referring to FIG. 4A, a high-definition multimedia interface (HDMI) transmission port 315 is connected with the connection interface 3101 as an interface for the multimedia playing module 3108 to output video/audio signals to an external terminal apparatus. The HDMI transmission port 315 is a fully digitalized video/audio signal transmission interface meeting the HDMI regulation for transmitting uncompressed audio and video signals at the same time. The audio and video signals are transmitted through the same cable so that the difficulty in installing the system wires is greatly lowered. The HDMI transmission port 315 is connected to an external terminal apparatus via an HDMI transmission cable 48.

HDMI is designed to replace the conventional analog video/audio transmission interface such as SCART or RCA terminal. HDMI supports various television and computer image forms including SDTV and HDTV video pictures in addition to multichannel digital audio signals. In transmission, various video data are encoded into data package by HDMI transceiver chip with transition minimized differential signaling (TMDS) technique. When the specification is initially regulated, the maximum pixel transmission rate is 165 Mpx/sec, which is sufficient to support 60 1080p pictures per second or UXGA definition (1600×1200). Later, in the HDMI 1.3 specification, it is expanded to 340 Mpx/sec to meet the possible requirements in the future. HDMI also supports the transmission of uncompressed 8-channel digital audio signals (sampling frequency 192 kHz, data length 24 bits/sample) and any compressed audio streaming such as Dolby Digital or DTS. HDMI also supports 8-channel 1 bit DSD signals used by SACD. In HDMI 1.3 specification, supports for super-high data amount uncompressed audio streaming such as Dolby TrueHD and DTS-HD are added. Four kinds of HDMI interfaces are regulated in HDMI specification book as follows:

1. HDMI A Type:
   It is applied to HDMI1.0 version, totally having 19 pin. The specification is 4.45 mm×13.9 mm, which is the most often seen HDMI connector specification equivalent to DVI Single-Link transmission. Before HDMI 1.2a, 165 MHz TMDS can be transmitted at the maximum. Therefore, the maximal transmission specification is only 1600×1200 (TMDS 162.0 MHz).

2. HDMI B Type:

It is applied to HDMI1.0 version, totally having 29 pin. The specification is 4.45 mm×21.2 mm. It can transmit TMDS data amount twice HDMI A Type, equivalent to DVI Dual-Link transmission for transmitting high definition (over WQXGA 2560×1600). (HDMI A Type only has Single-Link TMDS transmission so that in the case HDMI B Type signals are transmitted, the transmission efficiency must be twice. This will cause that the working frequency of Tx, Rx of TMDS must be increased to over 270 MHz. Before HDMI 1.3 IC shows up, most of the TMDS Tx, Rx on the market can stably work only under 165 MHz). Such interface is not applied to any product.

3. HDMI C Type:

It is commonly referred to as mini-HDMI and applied to HDMI1.3 version, totally having 19 pin. It can be said to be a minified version of HDMI A Type. The specification is 2.42 mm×10.42 mm. However, the pin definition is changed. It is mainly applied to portable device such as DV, digital camera and portable multimedia player. Due to the limitation of size, some display cards will employ mini-HDMI. A user needs to use an adapter to convert mini-HDMI into standard-size Type A and then connect it to a display.

4. HDMI D Type:

It is applied to HDMI1.4 version, totally having 19 pin. The specification is 2.8 mm×6.4 mm. However, the pin definition is changed. The new Micro HDMI interface will be about 50% smaller than the current 19-pin MINI HDMI version interface. It can provide at the highest 1080p definition support and at the fastest 5 GB transmission speed for portable device such as a camera or a mobile phone.

The HDMI transmission port 315 of the present invention is selected from the above four types of HDMI.

The first and second connection ports 301, 307 are such as, but not limited to, USB connection ports, wherein the USB is generally referred to the transmission protocol applicable to USB1.0, USB2.0 and USB3.0 series.

Please further refer to FIG. 4B, which is a block diagram showing that the present invention is connected with an external power and a charged mobile device or an external storage device and external terminal apparatus. As shown in the drawing, in this embodiment, the first connection port 301 is connected to an external power 40 for charging the battery 20. The second connection port 307 is connected to a charged mobile device 41 or an external storage device 42. The inbuilt card-reading unit 318 is for an electronic card 61 to insert in. The charged mobile device 41 is such as an intelligent mobile phone or a tablet. When the charged mobile device 41 is connected to the second connection port 307 and charged by the battery 20, the first control unit 305 detects whether the charged mobile device 41 is fully charged. If so, the battery 20 stops charging the charged mobile device 41. The external storage device 42 is such as, but not limited to, hard disk drive (HDD), card reader or pen driver. When the external storage device 42 is connected to the second connection port 307, the second control unit 310 detects the external storage device 42 as an expansion access device. The HDMI transmission port is connected to an external terminal apparatus 45 such as, but not limited to, a monitor, a television or a projector with HDMI connection port meeting the HDMI specification. When the wireless hotspot device is in the stream content display mode or the mirror display mode, the charged mobile device 41 is charged by the wireless hotspot device at the same time.

Figure 6:
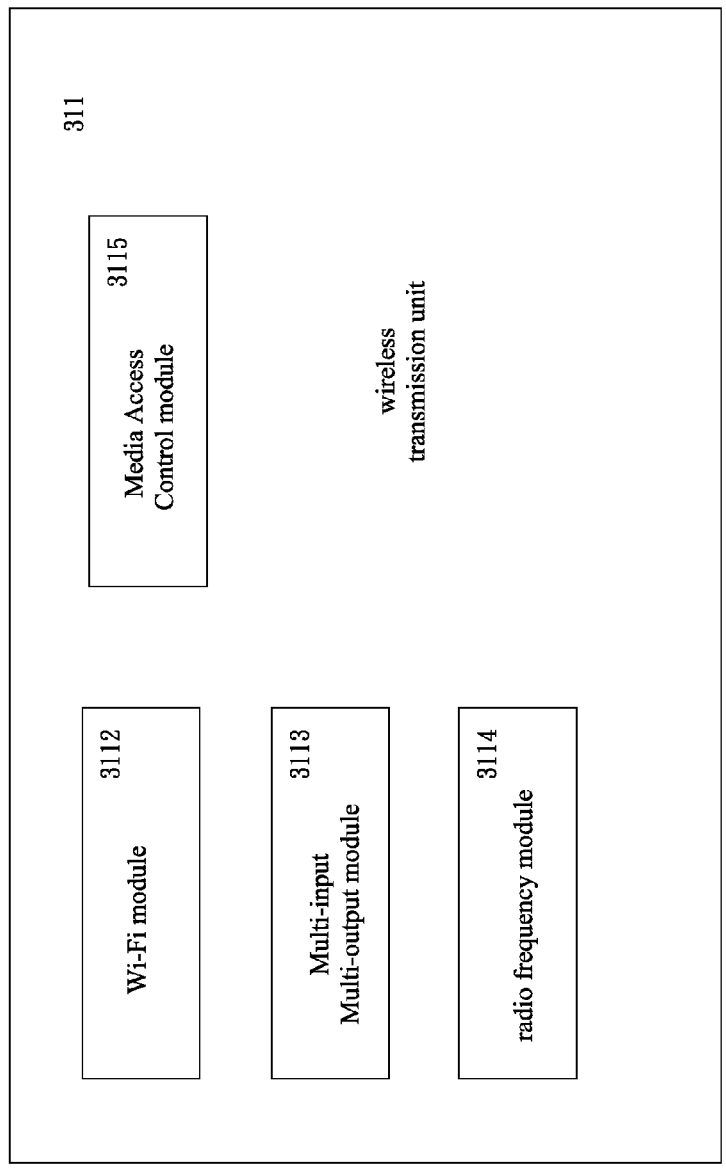
FIG. 6 is a block diagram of the wireless transmission unit of the present invention.

Referring to FIG. 5B, the multiple backup network/file access modules in the second control unit 310 include a server module 3103, a router module 3104, a cloud storage management module 3105, a file system module 3106 and a Secure Sockets Layer (SSL) module 3107. The server module 3103 includes a web server and FTP, HTTP, SFTP server. By means of the server module 3103, the wireless hotspot device of the present invention serves as a server end. When a subscriber end is wiredly or wirelessly connected to the wireless hotspot device of the present invention, a user can view or access the contents of the server end (the wireless hotspot device) via the viewer or APP application software of the subscriber end. The contents include character data, graphic data, multimedia data, etc. The contents can be stored in the flash memory 316 or the external storage device 42 (as shown in FIG. 4B). The router module 3104 serves to connect the wireless hotspot device with more than two respective networks. The cloud storage management module 3105 serves to support the subscriber end to upload and store the data of the subscriber end in the flash memory 316 of the wireless hotspot device or the external storage device 42 via Internet (as shown in FIG. 4B). The file system module 3106 serves to manage the data in the flash memory 316 or the data in the external storage device 42 (as shown in FIG. 4B). The SSL module 3107 serves to provide confidential transmission on Internet so as to ensure confidence and completeness of the communication and identify the server. SSL employs public key technique to ensure confidence and reliability of communication between two applications, whereby the communication between the subscriber and the server will not be tapped by an attacker. It is supported by both the server end and the subscriber end and has become an industrial standard for confident communication on Internet. As shown in FIG. 6, the wireless transmission unit includes a Wi-Fi module 3112, a Multi-input Multi-output (MIMO) module 3113 and a radio frequency (RF) module 3114. Via these modules, the wireless transmission protocol is supported and the quality of wireless transmission is enhanced. It further includes a Media Access Control (MAC) module 3115 for controlling the address of the media access. The Media Access Control (MAC) module 3115 serves to filter the subscriber end passing MAC address to allow or refuse the subscriber end to connect to the wireless network so as to effectively control the connection authorization of the wireless subscriber end.

Further referring to FIGS. 1~3, the upper casing 11 has a top wall 13 and multiple sidewalls 14a~14d perpendicularly extending from a periphery of the top wall 13. A pushbutton 15 is disposed on the top wall 13 corresponding to the switch 306. Multiple transparent sections 16 are arranged on the top wall 13 in alignment with the LED indicator 308. One sidewall 14a of the multiple sidewalls 14a~14d is formed with multiple perforations 17a~17d corresponding to the first and second connection ports 301, 307 and the HDMI transmission port 315 and the Ethernet connection port 312 respectively.

Figure 7:
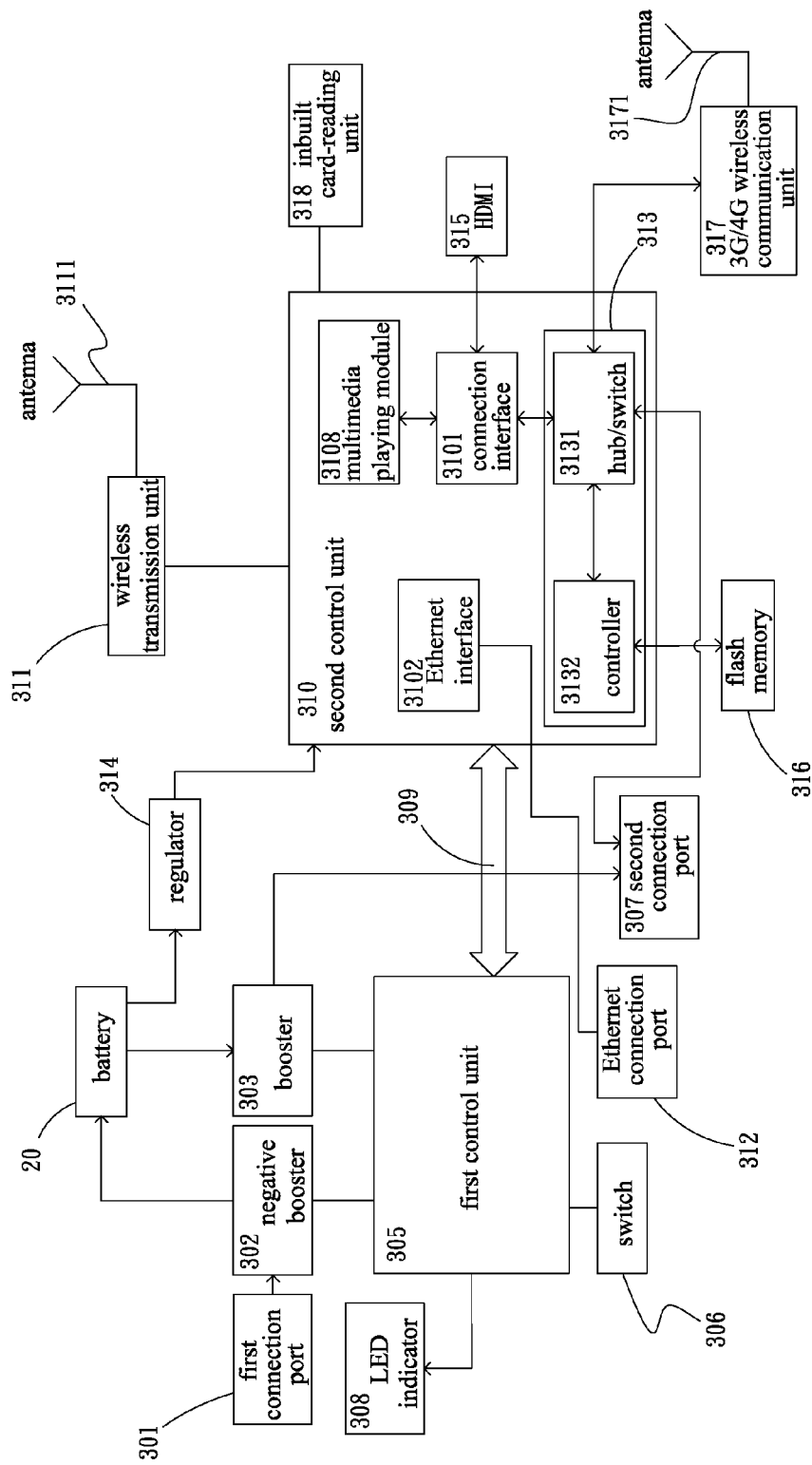
FIG. 7 is a block diagram of the present invention and the 3G/4G wireless communication unit connected with the present invention.

In addition, as shown in FIG. 7, a 3G/4G wireless communication unit 317 having an antenna 3171 and is connected to the hub/switch 3131. By means of the 3G/4G wireless communication unit 317, 3G/4G wireless transmission protocol is applicable to the wireless hotspot device of the present invention.

Figure 8:
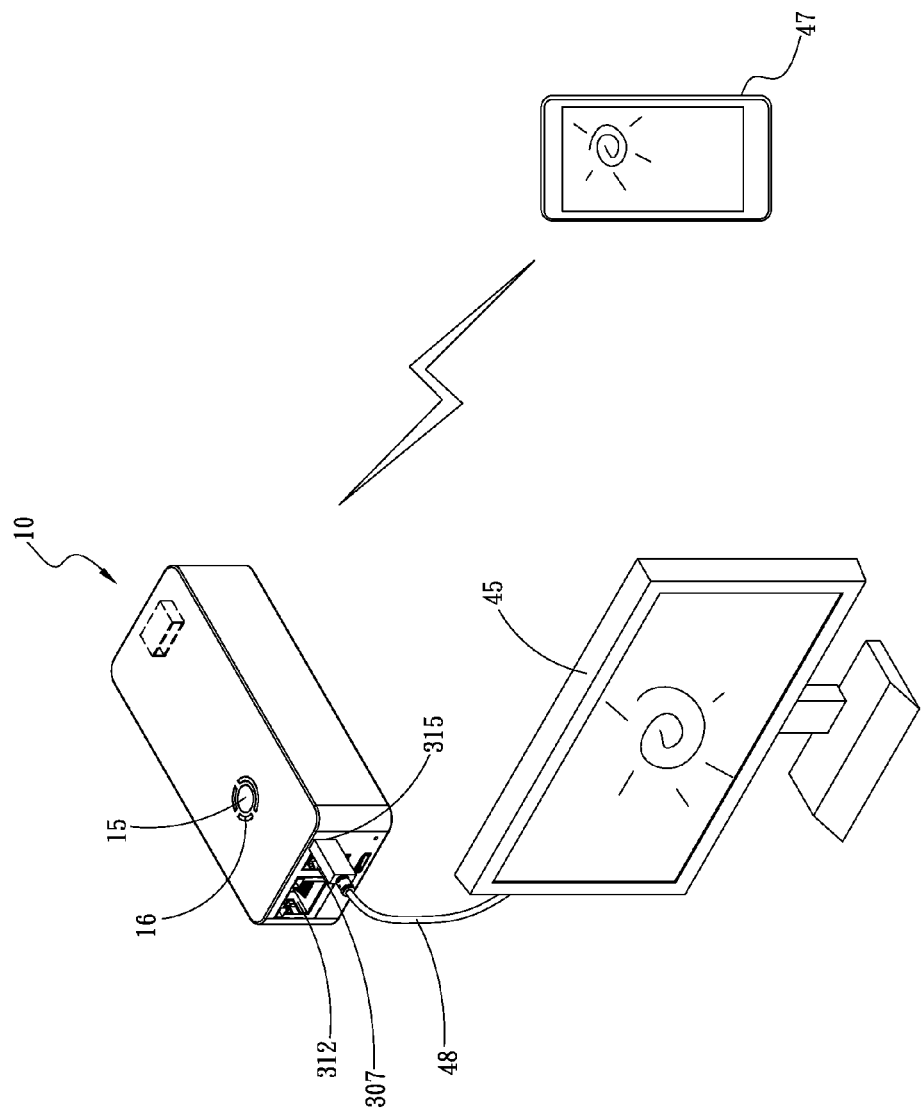
FIG. 8 is a view showing that the present invention is used to share the picture of the screen of the mobile device with the external terminal apparatus.

The following are some examples of practical use of the present invention:

Stream Content Display or Mirror Display:

As shown in FIG. 8 as well as FIGS. 4A, 4B, 5A, 5B and 6, the HDMI transmission port 315 of the wireless hotspot device of the present invention via an HDMI transmission cable 48 is connected to the external terminal apparatus 45, (which is a screen in the drawing). When the switch 306 is switched on, the battery power of the battery 20 is supplied to the first control unit 305, the second control unit 310, the wireless transmission unit 311 and the LED indicator 308 for operation. Via the bus 309, the first control unit 305 instructs the router module 3104 in the second control unit 310 to activate. The second control unit 310 turns on the Wi-Fi module 3112 and/or the Multi-input Multi-output (MIMO) module 3113 and/or the radio frequency (RF) module 3114 and/or the Media Access Control (MAC) module 3115 in the wireless transmission unit 311. A mobile device 47 in the region is wirelessly connected to the wireless transmission unit 311 via the antenna 3111 by means of wireless signal such as Wi-Fi signal. Then the picture or content of the screen of the mobile device 47 is duplicated or stream displayed on the screen of the external terminal apparatus 45 via the multimedia playing module 3108, the connection interface 3101 and the HDMI transmission port 315.

Figure 9:
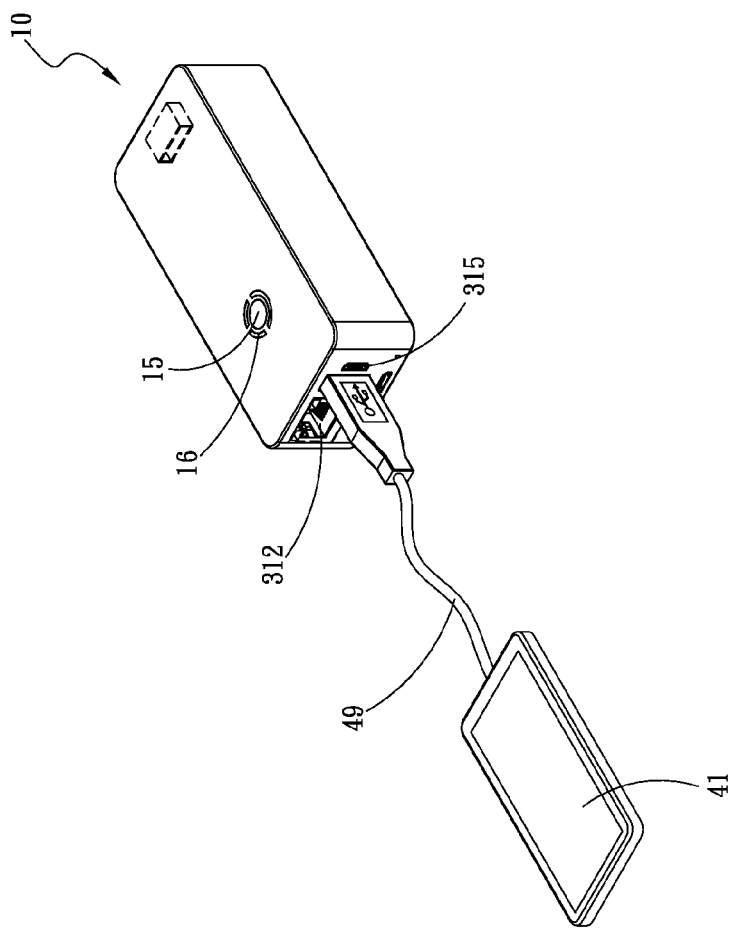
FIG. 9 is a view showing that the present invention is connected with a charged mobile device.

Recharge Mode:

As shown in FIG. 9 as well as FIGS. 4A, 4B, 5A, 5B and 6, the charged mobile device 41 such as an intelligent mobile phone is connected to the second connection port 307 via the transmission cable 49. When the switch 306 is switched on, the battery power of the battery 20 is supplied to the first control unit 305, the second control unit 310, the wireless transmission unit 311 and the LED indicator 308 for operation. The first control unit 305 controls the battery power of the battery 20 to charge the chargeable mobile device 41 via the second connection port 307 and detects whether the mobile device 41 is fully charged. If so, the battery 20 stops charging the mobile device 41.

Figure 10:
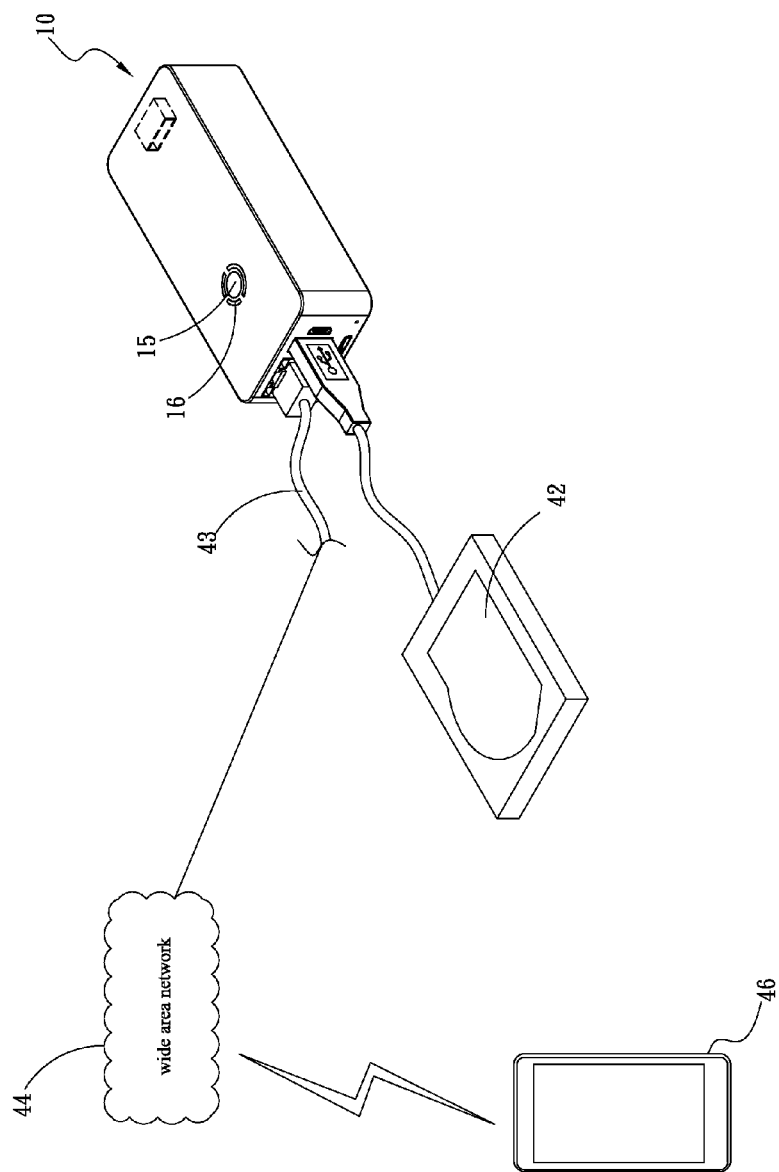
FIG. 10 is a view showing remote connection of the present invention.

Remote Connect:

As shown in FIG. 10 as well as FIGS. 4A, 4B, 5A, 5B and 6, the wireless hotspot device of the present invention is connected to the Ethernet connection port 312 via an Ethernet cable 43 and further connected to a wide area network 44. An external storage device 42 such as a pen driver is connected to the second connection port 307 via the transmission cable. When the switch 306 is switched on, the first control unit 305 via the bus 309 instructs the router module 3104 in the second control unit 310 to activate. Another mobile device 46 at a remote end is connected to the wide area network 44 via the wireless hotspot to connect with the wireless hotspot device of the present invention. A user can view and connect with the server module 3103 and the cloud storage management module 3105 in the second control unit 310 via the viewer or APP application software of the mobile device 46 to further view or access the contents of the flash memory 316 and the external storage device 42.

Figure 11A:
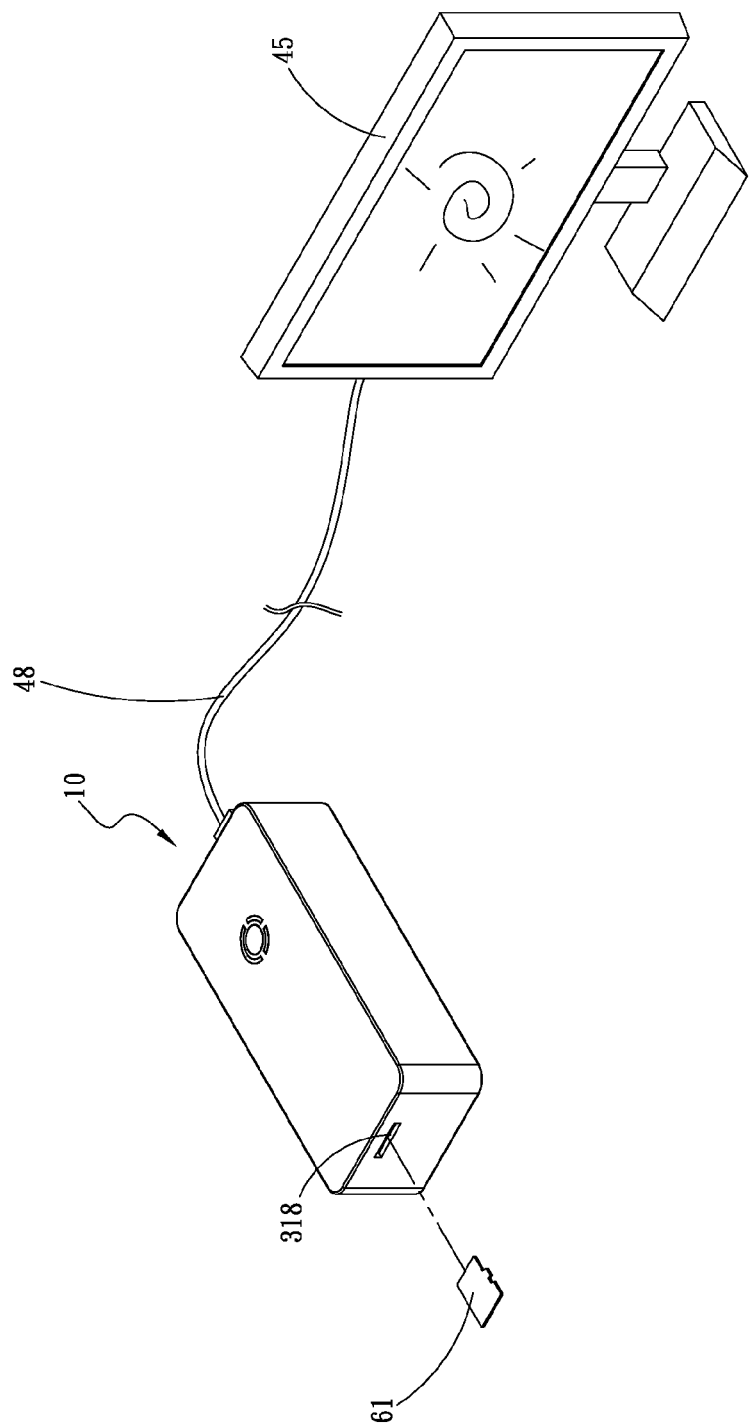
FIG. 11A is a view showing the card reader operation mode of the present invention in a first state.

Card Reader Operation:

As shown in FIG. 11A as well as FIGS. 4A, 4B, 5A, 5B, an electronic card 61 is inserted in the inbuilt card-reading unit 318 of the wireless hotspot device of the present invention. The HDMI transmission port 315 via the HDMI transmission cable 48 is connected to the external terminal apparatus 45, (which is a screen in the drawing). When the switch 306 is switched on, the battery power of the battery 20 is supplied to the first control unit 305, the second control unit 310, the wireless transmission unit 311 and the LED indicator 308 for operation. Via the multimedia playing module 3108 and the connection interface 3101 of the second control unit 310, the video/audio data in the electronic card 61 are output to and displayed on the external terminal apparatus 45 from and the HDMI transmission port 315 through an HDMI transmission cable 48.

In addition, as shown in FIG. 11B as well as FIGS. 4A, 4B, 5A, 5B, an electronic card 61 is inserted in the inbuilt card-reading unit 318 of the wireless hotspot device of the present invention. When the switch 306 is switched on, the battery power of the battery 20 is supplied to the first control unit 305, the second control unit 310, the wireless transmission unit 311 and the LED indicator 308 for operation. Via the bus 309, the first control unit 305 instructs the router module 3104 in the second control unit 310 to activate. The second control unit 310 turns on the Wi-Fi module 3112 and/or the Multi-input Multi-output (MIMO) module 3113 and/or the radio frequency (RF) module 3114 and/or the Media Access Control (MAC) module 3115 in the wireless transmission unit 311. A mobile device 47 in the region is wirelessly connected to the wireless transmission unit 311 via the antenna 3111 by means of wireless signal such as Wi-Fi signal. Then the second control unit 310 reads the data or video/audio data of the electronic card 61 in the inbuilt card-reading unit 318.

Figure 12:
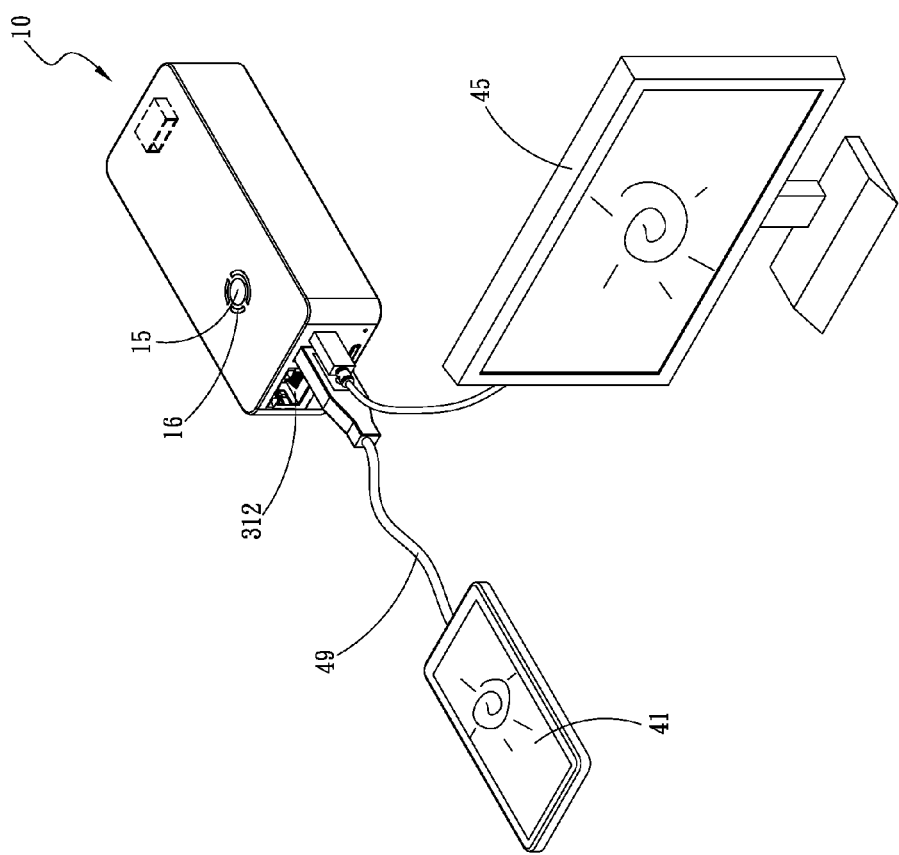
FIG. 12 is a view showing the stream content display or mirror display and recharge mode of the present invention.

Stream Content Display or Mirror Display and Recharge Mode:

As shown in FIG. 12 as well as FIGS. 4A, 4B, 5A, 5B, the HDMI transmission port 315 of the wireless hotspot device of the present invention via the HDMI transmission cable 48 is connected to the external terminal apparatus 45, (which is a screen in the drawing). A charged mobile device 41 such as an intelligent mobile phone is connected to the second connection port 307 via the transmission cable 49. When the switch 306 is switched on, the battery power of the battery 20 is supplied to the first control unit 305, the second control unit 310, the wireless transmission unit 311 and the LED indicator 308 for operation. The first control unit 305 controls the battery power of the battery 20 to charge the chargeable mobile device 41 via the second connection port 307 and detects whether the mobile device 41 is fully charged. If so, the battery 20 stops charging the mobile device 41. Also, via the bus 309, the first control unit 305 instructs the router module 3104 in the second control unit 310 to activate. The second control unit 310 turns on the Wi-Fi module 3112 and/or the Multi-input Multi-output (MIMO) module 3113 and/or the radio frequency (RF) module 3114 and/or the Media Access Control (MAC) module 3115 in the wireless transmission unit 311. The chargeable mobile device 47 is wirelessly connected to the wireless transmission unit 311 via the antenna 3111 by means of wireless signal such as Wi-Fi signal. Then the picture or content of the screen of the mobile device 47 is duplicated or stream displayed on the screen of the external terminal apparatus 45 via the multimedia playing module 3108, the connection interface 3101 and the HDMI transmission port 315.

Figure 13A:
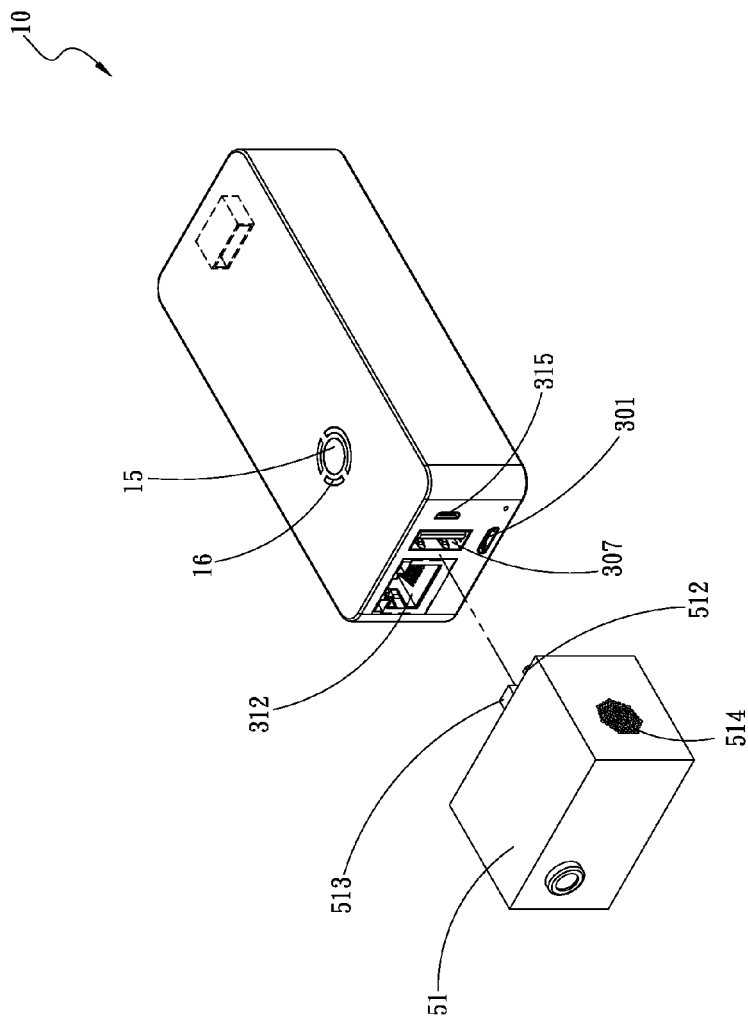
FIG. 13A is a perspective exploded view showing that the present invention is connected with a micro projection optical device.
Figure 13B:
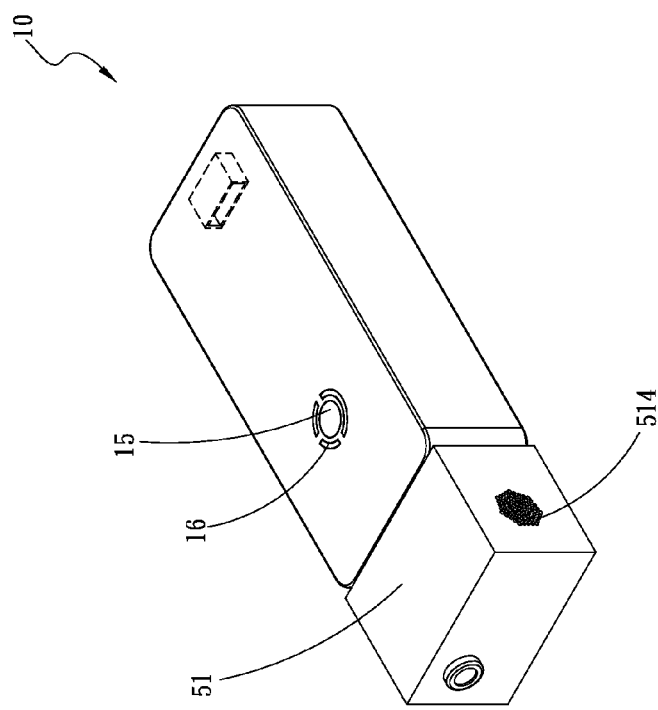
FIG. 13B is a perspective assembled view showing that the present invention is connected with the micro projection optical device.
Figure 14:
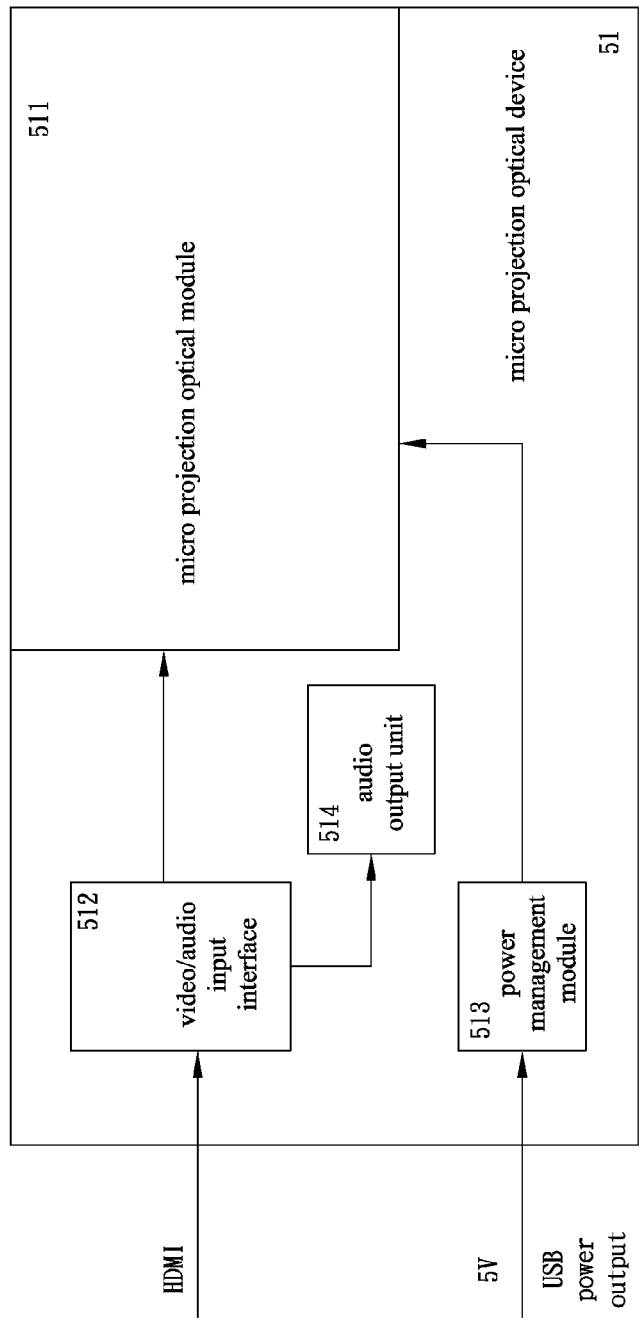
FIG. 14 is a block diagram of the micro projection optical device.

Please further refer to FIGS. 13A, 13B and 14. FIG. 13A is a perspective exploded view showing that the present invention is connected with a micro projection optical device. FIG. 13B is a perspective assembled view showing that the present invention is connected with the micro projection optical device. FIG. 14 is a block diagram of the micro projection optical device. As shown in the drawings, the wireless hotspot device of the present invention is connectable with a micro projection optical device 51. The micro projection optical device 51 includes a micro projection optical module 511 connected with a video/audio input interface 512 and a power management module 513. The video/audio input interface 512 is connected with an audio output unit 514. The micro projection optical module 511 includes a backlight source and an optical apparatus for adjusting the projection size and focusing to form the images from the image signals and output/project the images. The video/audio input interface 512 is an HDMI input port connected to the HDMI transmission port 315 of the wireless hotspot device to receive video/audio signals. The power management module 513 is connected to the second connection port 307 of the wireless hotspot device to receive the power of the battery 20 as the power source for operation of the micro projection optical device 51. The audio output unit 514 is such as a speaker for outputting audio signals.

Figure 15:
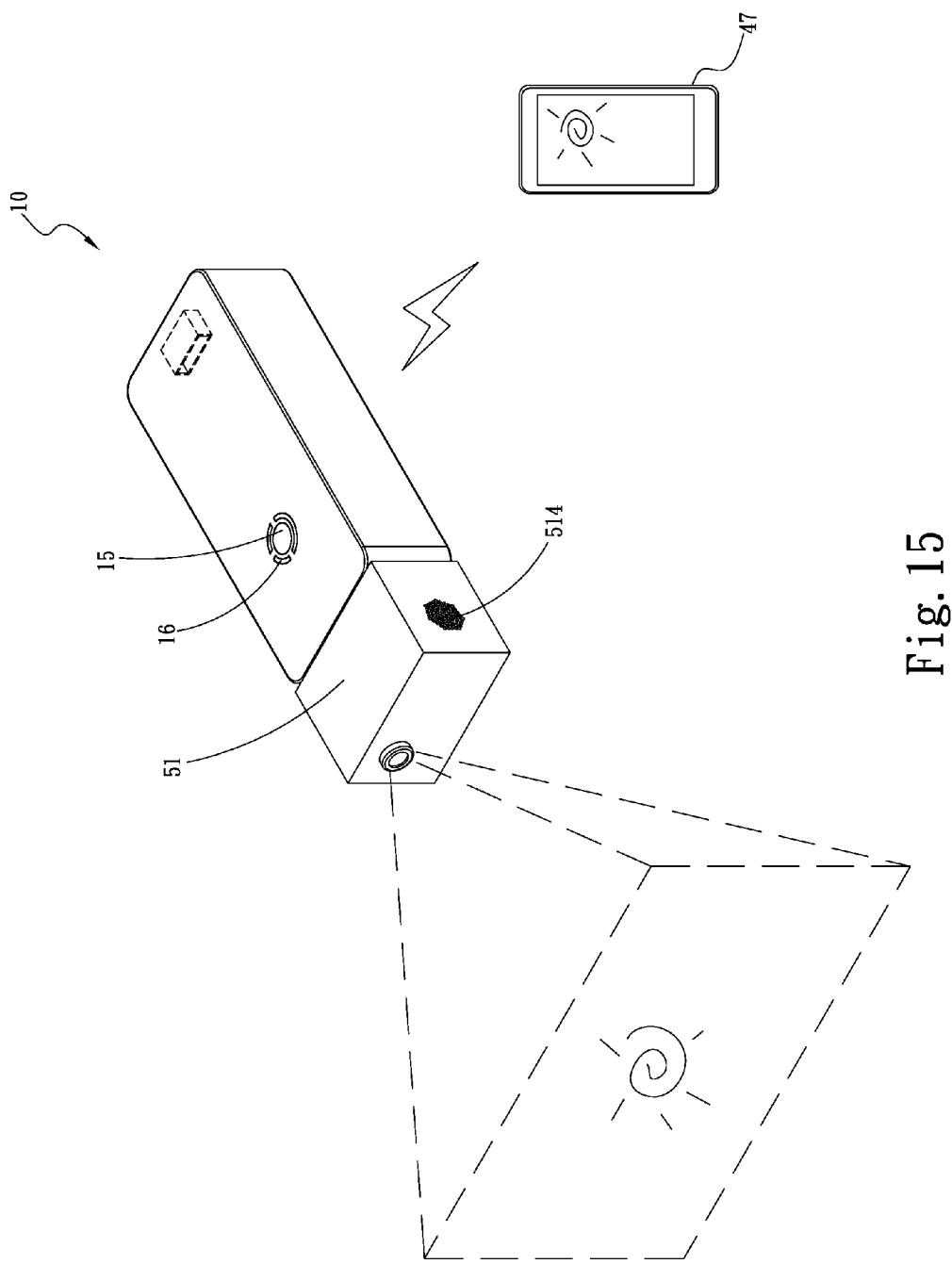
FIG. 15 is a view showing that the content of the screen of the mobile device is projected from the micro projection optical device via the present invention.

The operation of the micro projection optical device 51 connected with the present invention is as follows:

Please refer to FIG. 15, which is a view showing that the content of the screen of the mobile device is projected from the micro projection optical device via the present invention. Also with reference to FIGS. 4A, 4B, 5, 6, 13A and 13B, the wireless hotspot device of the present invention is connected with the micro projection optical device 51. When the switch 306 is switched on, the battery power of the battery 20 is supplied to the first control unit 305, the second control unit 310, the wireless transmission unit 311 and the LED indicator 308 for operation. Also, via the second connection port 307, the battery power of the battery 20 is output to the micro projection optical device 51 for operation. Via the bus 309, the first control unit 305 of the wireless hotspot device instructs the router module 3104 in the second control unit 310 to activate. The second control unit 310 turns on the Wi-Fi module 3112 and/or the Multi-input Multi-output (MIMO) module 3113 and/or the radio frequency (RF) module 3114 and/or the Media Access Control (MAC) module 3115 in the wireless transmission unit 311. A mobile device 47 in the region is wirelessly connected to the wireless transmission unit 311 via the antenna 3111 by means of wireless signal such as Wi-Fi signal. Then the picture of the screen of the mobile device 47 is input to the video/audio input interface 512 of the micro projection optical device 51 via the multimedia playing module 3108, the connection interface 3101 and the HDMI transmission port 315. Then the micro projection optical device 51 projects the images.

In conclusion, by means of the present invention, the picture of the screen of a mobile device can be synchronously displayed on an external terminal apparatus. Alternatively, the wireless hotspot device of the present invention can be connected with a micro projector device to project the picture of the screen of the mobile device. Moreover, the present invention can charge a mobile device or enable another mobile device to wirelessly access data via Internet. Also, the present invention serves as a wireless hotspot device for server end and cloud access. In addition, the present invention serves as a wireless hotspot device for a router to access the data of the external expansion storage device via network stream.

The present invention has been described with the above embodiments thereof and it is understood that many changes and modifications in the above embodiments can be carried out without departing from the scope and the spirit of the invention that is intended to be limited only by the appended claims.

What is claimed is:

1. A wireless hotspot device capable of sharing video picture, comprising:
    a negative booster connected with a first connection port and a battery, the first connection port being for an external power to input power;
    a booster connected with the battery and a second connection port;
    a first control unit connected with the negative booster, the booster, a switch and an LED indicator, the first control unit serving to control the external power passing through the negative booster to drop the voltage of the external power to a voltage meeting the battery power and control the booster to boost the voltage of the battery power to a preset value;
    a second control unit connected with the first control unit and a wireless transmission unit, the second control unit including a connection interface connected with a multimedia playing module, an Ethernet interface, multiple backup network/file access modules and a connector module, the multiple backup network/file access modules being used to control the data transmission/access of the networks and cloud, the connector module including a hub/switch connected with a controller, the hub/switch being further connected with the connection interface and the second connection port, the controller being connected with a flash memory, the second connection port being for outputting the battery power or transmitting data;
    an Ethernet connection port connected with the Ethernet interface of the second control unit;
    a regulator connected with the battery and the second control unit, through the regulator, the battery power being provided for the second control unit and the wireless transmission unit; and
    a high-definition multimedia interface (HDMI) transmission port connected with the connection interface of the second control unit as an interface for the multimedia playing module of the second control unit to output video/audio signals.

2. The wireless hotspot device capable of sharing video picture as claimed in claim 1, wherein the first and second connection ports are USB connection ports.

3. The wireless hotspot device capable of sharing video picture as claimed in claim 1, wherein the connector module is a USB connector module, the hub/switch is a USB hub/switch and the controller is a USB controller.

4. The wireless hotspot device capable of sharing video picture as claimed in claim 1, wherein the second connection port is connected with a charged mobile device or an external storage device.

5. The wireless hotspot device capable of sharing video picture as claimed in claim 4, wherein the external storage device is selected from a group consisting of hard disk drive (HDD), card reader and pen driver.

6. The wireless hotspot device capable of sharing video picture as claimed in claim 4, wherein the HDMI transmission port is connectable with an external terminal apparatus.

7. The wireless hotspot device capable of sharing video picture as claimed in claim 6, wherein the external terminal apparatus is selected from a group consisting of a monitor, a television and a projector.

8. The wireless hotspot device capable of sharing video picture as claimed in claim 1, wherein the multiple backup network/file access modules include a server module, a router module, a cloud storage management module, a file system module and a secure sockets layer module.

9. The wireless hotspot device capable of sharing video picture as claimed in claim 1, wherein the first and second control units are connected via a bus.

10. The wireless hotspot device capable of sharing video picture as claimed in claim 9, further includes a 3G/4G wireless communication unit connected with the hub/switch.

11. The wireless hotspot device capable of sharing video picture as claimed in claim 1, which is connected with a micro projector device, the micro projector device including a micro projection optical module connected with a video/audio input interface and a power management module, the video/audio input interface being connected with an audio output unit, the video/audio input interface being connected with the HDMI transmission port of the wireless hotspot device, the power management module being connected to the second connection port of the wireless hotspot device.

12. The wireless hotspot device capable of sharing video picture as claimed in claim 1, wherein the multimedia playing module includes a DLNA module, a WiDi module, an Airplay module and a Miracast module.

13. The wireless hotspot device capable of sharing video picture as claimed in claim 1, wherein the second control unit is connected with an inbuilt card-reading unit.

14. The wireless hotspot device capable of sharing video picture as claimed in claim 13, wherein the inbuilt card-reading unit is a card-reading slot for an electronic card to insert therein.

15. The wireless hotspot device capable of sharing video picture as claimed in claim 14, wherein the electronic card is selected from a group consisting of Secure Digital card (SD), Near Field Communication card (NFC), Compact Flash card (CF), SmartMedia card (SMC), Multimedia card (MMC) and Memory stick card (MS).

\* \* \* \* \*